March 29, 1960

W. H. HOGAN ET AL 2,930,608

LIQUID SPRING

Filed April 4, 1956

INVENTORS
WALTER H. HOGAN
BY ANTHONY V. CAMINO

ATTORNEY

United States Patent Office 2,930,608
Patented Mar. 29, 1960

2,930,608

LIQUID SPRING

Walter H. Hogan, Olmstead Falls, and Anthony V. Camino, Cleveland, Ohio, assignors to Cleveland Pneumatic Industries, Inc., Cleveland, Ohio, a corporation of Ohio Application April 4, 1956, Serial No. 575,988

7 Claims. (Cl. 267—64)

This invention relates to fluid seals and more particularly to a fluid seal adapted for use in a liquid spring having means to automatically compensate for leakage or temperature changes.

It is an important object of this invention to provide fluid seal for a liquid spring which automatically compensates for leakage and temperature changes.

It is another important object to provide a liquid spring including new and improved seal means which automatically open when the liquid spring moves into the extended position to permit automatic precharging of the spring.

It is still another object to provide a liquid spring including an annular seal member adapted to engage and seal with the plunger shaft of the spring only when the spring is under relatively high pressures.

It is still another object of this invention to provide a fluid seal for use with the high pressures which occur in liquid springs and the like.

Further objects and advantages will appear from the following description and drawings, wherein.

A sealing device according to the invention is particularly adapted for use in liquid springs of the type described in the copending application of Walter H. Hogan, Serial No. 560,725, filed January 23, 1956. Such liquid springs are particularly adapted for use as the shock absorber and supporting spring in landing gears or the like because they are automatically compensated for temperature changes and leakage. In normal liquid springs of this type the liquid within the spring is precharged to a pressure in the order of 1000 pounds per square inch and reaches maximum pressures of 40,000 to 60,000 pounds per square inch when the spring is fully compressed with normal static position pressures of about 20,000 pounds per square inch. If such a liquid spring is charged then the ambient temperature is 70° F. and is then subjected to temperature of 160° F. The precharge increased radially due to expansion of the liquid and over pressure results when the spring is compressed. Conversely, if after the initial precharge the temperature of the spring is reduced to sub zero temperatures as low as —65° F. the precharge reduces and in some extreme cases a vacuum develops. This results in a loss of the spring's effectiveness because it radically changes the pressure stroke relationship.

In the liquid spring disclosed in the above cited copending application a mechanically pressurized reservoir chamber is provided which is in fluid communication with the main spring chamber only when the spring moves to the fully exended position. The reservoir chamber is mechanically maintained at the desired precharge pressure for the particular temperature so that the liquid is supplied to the main spring chamber or removed therefrom automatically until the proper precharge is achieved. Since the radical temperature changes to which an aircraft is subjected take place while the aircraft is flying from one climatic zone to another and since a landing gear liquid spring is in the fully extended position at this time proper temperature compensation results. For a detailed description of the operation and advantages of the compensated liquid spring, reference should be made to the copending application cited above.

Figure 1:
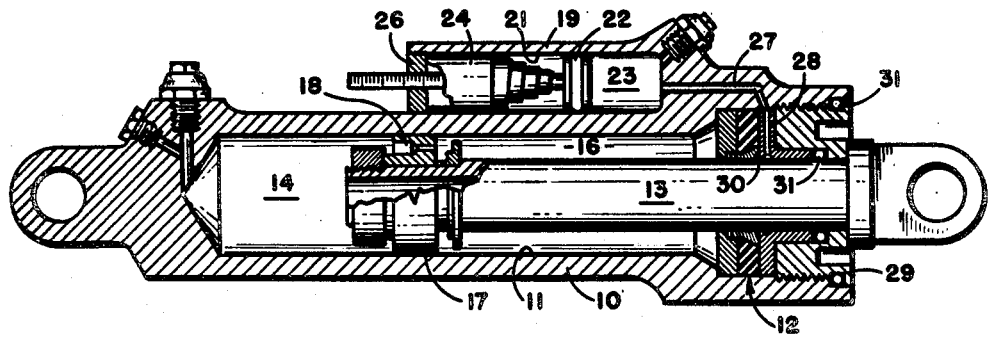
Figure 1 is a side elevation in longitudinal section of a preferred liquid spring incorporating a seal device according to the invention.

In Figure 1 a liquid spring incorporated in this invention is shown wherein a cylinder body 10 is formed with an axially extended bore 11 closed at its outer end by a seal assembly 12 through which extends a plunger 13. The cavity within the bore is divided into first and second chambers 14 and 16 respectively by a piston head 17 mounted on the plunger 13. The two chambers 14 and 16 are in fluid communication through a restricted orifice 18 formed in the piston head 17 in such a manner that axial movement of the piston head 17 causes liquid flow through the orifice between the two chambers 14 and 16 in a direction determined by the direction of the piston head movement. This provides damping which resists movement of the piston head and results in a dissipation of energy so that the mechanism may absorb impact or vibration energy.

Movement of the plunger 13 to the left to the fully compressed position shown in Figure 1 reduces the total volume of the two chambers 14 and 16 by an amount equal to the additional displacement of the plunger 13 caused by such movement, and movement in the opposite direction results in an increase in the total volume of the two chambers. The two chambers are filled with liquid and pressurized with a precharged pressure in the order of 1000 pounds per square inch when the plunger 13 is in the fully extended or right handed position at which time the piston head 17 is adjacent to the seal assembly 12. Movement of the piston 13 from the fully extended position to the left results in a decrease in the total volume of the two chambers 14 and 16 and causes the compression of the liquid contained therein. It should be understood that the two chambers 14 and 16 are entirely filled with liquid at all times so it is the liquid itself that is compressed.

The cylinder body 10 is formed with a boss 19 providing an axially extending reservoir bore 21 parallel to the bore 11. Positioned within the reservoir bore 21 is a piston 22 which cooperates with the walls of the bore 21 to define a reservoir chamber 23. A mechanical spring 24 extends between an end member 26 mounted in the open end of the reservoir bore 21 and the piston 22 and urges the piston 22 to the right thereby pressurizing liquid contained in the reservoir chamber 23 to a pressure which is a function of the force of the spring and the area of the piston. The reservoir chamber 23 is connected to the low pressure side of the seal assembly 12 by fluid passageways 27 formed in the cylinder member 10 and a bearing member or back up plate 28 so the reservoir chamber 23 is in fluid communication with a low pressure zone 30 around the plunger 13 on the right hand side of the seal assembly 12. A gland member 29 is threaded to the cylinder member 10 around the plunger 13 and axially secures the bearing member 28 in the cylinder member 10. Hydraulic seals 31 provide a sealing engagement between the gland member 29 and both the cylinder member 10 and plunger 13 so that the low pressure zone 30 is defined between the seal assembly 12 and the gland member 29 around the plunger 13.

Figure 2:
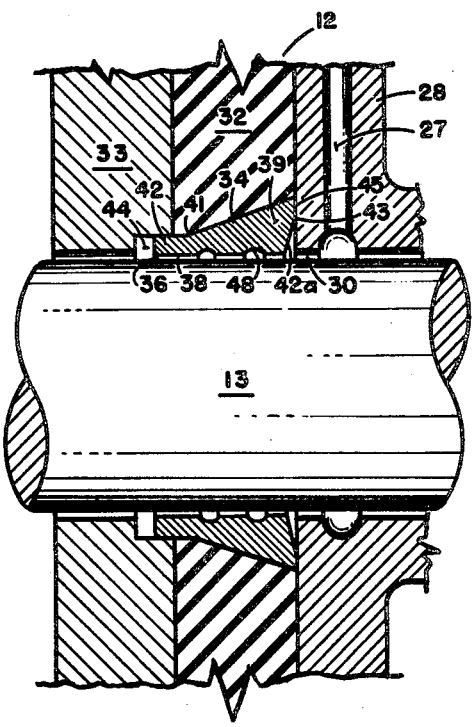
Figure 2 is an enlarged fragmentary longitudinal section showing the structural details of the seal ring.

Reference should now be made to Figure 2 for the structural details of the seal assembly 12 which includes a disc shaped rubber member 32 positioned between the bearing member 28 and a pressure plate 33. An annular metal seal ring 34 is positioned around the plunger 13 radially within the rubber member 32 and it is this member which provides the fluid seal with the plunger 13 when the plunger moves toward the compressed position. The seal ring 34 is formed with a bore 38 through which the plunger 13 projects. The bore 38 is sized so that clearance 36 is provided between the ring and plunger 13 when the ring is in the unstressed position. The clearance 36 is exaggerated in the drawings for purposes of illustration but will normally be about .0005 of an inch.

When the plunger is in the fully extended position, at which time the pressure of the liquid within the chambers 14 and 16 is in the order of 1000 pounds per square inch, fluid communication is provided between the chamber 16 and the reservoir chamber 23 through the clearance 36 and the passageways 27. Since all three chambers 14, 16 and 23 are in communication at this time the pressures of these chambers will be equalized. When the spring is compressed abruptly as by the impact of an aircraft landing the pressure in the chambers 14 and 16 very rapidly reaches pressures in excess of 20,000 pounds per square inch. Because the clearance 36 is small only a negligible amount of liquid will flow therethrough during the short period of time it takes for the pressure to build up so the pressure in the reservoir chamber will be unchanged. The seal ring 34 is compressed into engagement with the plunger 13 in a manner about to be described and isolates the chamber 16 from the low pressure zone 30 to the right of the seal assembly 12. Preferably, the proportions should be arranged so that the seal ring 34 engages the plunger 13 and isolates the reservoir chamber 23 from the second chamber 16 when the pressure within the second chamber 16 reaches a pressure of about 10,000 pounds per square inch which is well below the liquid pressure in that chamber when the spring is supporting the static weight of the aircraft.

The main portion 39 of the seal ring is conical and extends from the right hand end of the seal ring 34 to an intermediate point 41 beyond which it is formed with a cylindrical portion 42. The right end of the seal ring is undercut to form a conical surface 42a which extends from the inner bore 38 to a line 43 spaced from the outer edge of the ring. Between the line 43 and the outer edge an annular radical surface 45 is provided which is in engagement with the bearing member or back up plate 28. The pressure plate 33 is formed with a counterbore 44 into which the cylinder portion 42 projects, however, clearance is provided between the end of the counter bore 44 and the end of the seal ring 34 so that the pressure plate is free for limited movement relative to the seal ring 34.

Figure 3:
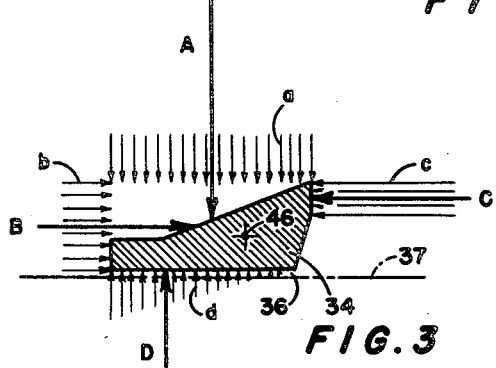
Figures 3, 4 and 5 are free body diagrams illustrating the operation of the seal ring.
Figure 4:
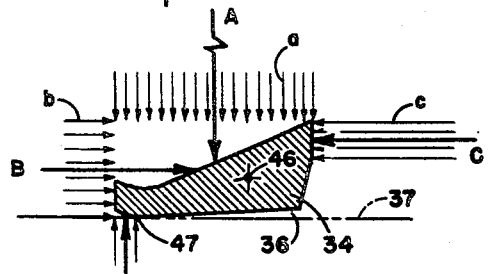
Figure 5:
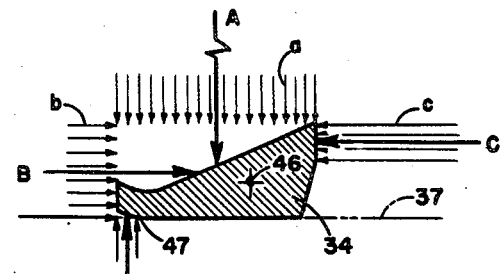

Referring to Figures 3 to 5 the seal ring 34 is shown in a free body diagram around the plunger schematically shown as a line 37. It should be understood that in these figures only a single section through the seal ring is shown but since the seal ring is symmetrical, any longitudinal section through the axis of the ring will appear the same and will be subjected to the same forces. The forces created by the precharged pressure have been neglected in the following analysis for simplification but since they are small when compared to the other forces they are not critical to the operation of the seal.

In Figure 3 the forces are shown as they operate on the seal ring 34 prior to the deflection of the ring from its unstressed position. It should be understood that this condition only occurs instantaneously immediately after the liquid spring is compressed. Since the rubber member 32 is resilient and completely confined it functions like a fluid and transmits equal pressures in all directions so the pressure of the liquid in the chamber 16 compresses the rubber member 32 and produces radial forces a tending to compress the seal ring 34 wherein the forces a are uniform throughout the axial extent of the ring. Axial forces b having the same magnitude as the forces a operate over the projected area of the left end of the ring 34 urging it to the right into engagement with the bearing member 28. Since the area of the radial surface 45 which engages the bearing member 28 is substantially smaller than the projected area of the ring, the pressure of engagement over this area illustrated by the forces c is substantially greater than the forces b per unit area on the projected area. When the ring 34 is unstressed as in Figure 3 the uniform clearance 36 acts as an orifice permitting a flow of liquid from the second chamber 16 through the clearance 36 to the right hand side of the seal ring 34. Because the clearance is uniform the pressure distribution of the outward forces d will be in the form of a triangle with a maximum pressure at the left hand end of the seal ring 34 and zero pressure at the right hand end. This of course neglects the precharged pressure as mentioned previously.

Because the forces a are uniform through the entire length of the seal ring 34 they may be resolved into a single force A midway between the ends of the seal ring. The forces b are also uniform so they may be resolved into a single force B acting at the mid point of the projection area of the end of the ring and the forces c can be resolved into a single force C acting along the mid point of the radial surface 43. When resolving the forces d into a single force D the line of action of this force is not midway between the ends of the seal ring because of the triangular pattern of these forces so the resolved force D acts along a line of action spaced from the left end of the ring 34 one-third of the length of the inner bore 38. The force B is equal and opposite to the force C and the force A will be substantially twice the magnitude of the force D. The centroid 46 of the section of the ring 34 is located to the right of the lines of action of the forces A and D and radially inward from the forces B and C. Therefore, a counterclockwise force moment is developed on the seal ring 34 around the centroid 46 by the forces A and C and a clockwise force moment is developed by the forces D and B. The magnitude of each of these moments is a function of the magnitude of the forces times the effective perpendicular distance between the lines of action of each force and the centroid 46. Because the effective distance of the force D is greater than the effective distance of the force A and because the force A is greater than the force D the moments developed by these two forces will tend to balance out. However, the force C produces a greater moment in the counterclockwise direction than the force B because it is spaced further from the centroid 46 so a counterclockwise moment is developed on the seal ring 34 which deflects the left end of the ring radially inward against the plunger which is the condition shown in Figure 4.

When the pressure of the liquid reaches a predetermined pressure which is preferably well below the static pressure the seal ring will be deflected from the position of Figure 3 to the position of Figure 4 causing the seal ring 34 to engage the plunger 13 at a point 47 spaced from the left end of the seal ring. The extreme left end of the seal ring does not engage the plunger 13 because the cylindrical portion 42 has a uniform radial extent and increments at the extreme left end are spaced from the centroid 46 a maximum distance and therefore provide greater resistance to deflection. By arranging the point on the initial engagement 47 so that it is spaced from the left end of the ring 34 the possibility of the ring digging into the plunger 13 is eliminated. Engagement at the point 47 prevents further flow of liquid through the clearance so that the pressure to the right of point 47 immediately drops to zero. Therefore, the only force resisting compression of the ring to the right of the point 47 is the resistance of the metal so the entire length of the ring to the right of the point 47 will immediately assume the position of Figure 5 wherein there is a sealing engagement with the plunger 13 along the entire length to the right of the point 47. Preferably, the seal ring 34 is formed of a metal which will provide good wearing characteristics as the plunger 13 moves back and forth. Since the plunger is normally formed of steel, the seal ring should be chrome plated to insure adequate life. To insure that the seal ring is lubricated it is desirable to provide shallow annular grooves 48 along the inner bore 38 which trap and retain liquid as the spring operates.

When the plunger 13 returns to the fully extended position after a compression stroke the pressure of the liquid in the chambers 16 returns to a pressure substantially equal to the pressure in the reservoir chamber 23. Because the internal forces in the metal of the ring 34 are greater than the forces developed by the liquid tending to compress the ring at this time the seal ring returns to its unstressed position and therefore operates to permit fluid flow between the chamber 16 and the reservoir chamber 23 each time the plunger 13 returns to the extended position. A small clearance will permit adequate flow when the spring is extended since the amount of liquid which passes through the clearance is small and there is sufficient time even though the rate of flow is slow. The small amount of leakage which will pass through the clearance 36 after compression of the spring and prior to the sealing of the seal ring will not effect the operation of the spring during the stroke and will be returned to the chambers 14 and 16 as soon as the plunger returns to the extended position. Those skilled in the art will recognize that the real ring will provide a highly efficient fluid seal which can operate effectively at high pressure which occur within the liquid springs and also perform the functions of the valve between the reservoir chamber and the main chambers of the liquid so that the spring can be fully compensated for temperature changes and leakage. If desired pins of the type shown in the patent to Bingham Number 2,308,149 may be used to increase the pressure in the rubber member 32 to produce higher sealing forces.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

We claim:

1. A liquid spring comprising cylinder and plunger members capable of relative movement, seal means extending between said members cooperating therewith to define a liquid filled cavity the volume of which is changed by said relative movement, a source of pressure fluid in communication with a zone adjacent to said seal means on the side thereof opposite to said cavity, said seal means including a seal ring formed with a central bore through which said plunger projects, said bore and plunger being proportioned so that clearance is provided therebetween when said ring is unstressed to provide fluid communication therethrough in both directions between said cavity and source, said ring being deflected into sealing engagement with said plunger by virtue of the pressure in said cavity when the pressure of the liquid in said cavity exceeds the pressure of said source.

2. A liquid spring comprising cylinder and plunger members capable of relative movement, seal means extending between said members cooperating therewith to define a liquid filled cavity the volume of which is changed by said relative movement, a source of pressure fluid in communication with a zone adjacent to said seal means on the side thereof opposite to said cavity, said seal means including a seal ring formed with a central bore through which said plunger projects, said bore and plunger being proportioned so that clearance is provided therebetween when the pressure of the liquid in said cavity exceeds the pressure of said source by less than a predetermined amount to provide fluid communication therethrough in both directions between said cavity and source, said ring being deflected into sealing engagement with said plunger by virtue of the pressure in said cavity when the pressure of the liquid in said cavity exceeds the pressure of said source by more than said predetermined amount thereby isolating said source and cavity.

3. A sliding fluid seal device comprising a plunger, an annular ring formed with a bore through which said plunger projects, a chamber filled with pressure liquid defined in part by said plunger and one side of said ring, said bore and plunger being proportioned so that clearance is provided therebetween when said ring is unstressed so that fluid communication is provided between both sides of said ring, and means compressing said ring into sealing engagement with said plunger by virtue of the pressure of said liquid when the pressure thereof exceeds a predetermined value.

4. In a device of the character described a plunger, a pressure plate, a backup plate, a resilient disc positioned between said pressure and backup plates, and a sealing ring radially within said disc, said ring being formed with a bore through which said plunger projects, said bore and plunger being proportioned so that clearance is provided therebetween when said ring is unstressed, pressure liquid in contact with said plunger, seal ring and pressure plate, said pressure liquid compressing said resilient disc producing a uniform radial pressure along the circumference of said ring tending to compress it into engagement with said plunger and an axial force urging said ring into engagement with said backup plate along an area radially spaced from said bore, forces on said ring created by said pressure liquid producing a resulting force moment around the centroid of the ring which deflect the end of the ring spaced from said backup plate into engagement with said plunger when the pressure of said liquid reaches a predetermined value.

5. In a device of the character described a plunger, a pressure plate, a backup plate, a resilient disc positioned between said pressure and backup plates, and a sealing ring radially within said disc, said ring being formed with a bore through which said plunger projects, said bore and plunger being proportioned so that clearance is provided therebetween when said ring is unstressed, pressure liquid in contact with said plunger, seal ring and pressure plate, said pressure liquid compressing said resilient disc which in turn produces a uniform radial pressure along the circumference of said ring tending to compress it into engagement with said plunger and an axial force urging said ring into engagement with said backup plate, the forces on said said ring created by said pressure liquid producing a resulting force moment around the centroid of the ring which deflect the end of the ring spaced from said backup plate into engagement with said plunger when the pressure of said liquid reaches a predetermined value.

6. A seal assembly comprising a movable shaft, a seal ring formed with a bore through which said shaft projects, said bore being sized so that clearance is provided between said shaft and ring when said ring is unstressed, a backup plate at one end of said ring engaged thereby along an annular area radially spaced from said bore, a first portion of said ring extending from said one end being formed with a conical outer surface of a radius diminishing in a direction away from said one end and a cylindrical portion extending from said first portion to the other end of said ring whereby pressure fluid on the same side of said backup plate as said ring produces forces which deflect said ring into sealing engagement with said shaft when the pressure thereof reaches a predetermined value.

7. A seal assembly comprising a movable shaft, a seal ring formed with a bore through which said shaft projects, said bore being sized so that clearance is provided between said shaft and ring when said ring is unstressed, a backup plate at one end of said ring engaged thereby along an annular area radially spaced from said bore, a first portion of said ring extending from said one end being formed with a conical outer surface of a radius diminishing in a direction away from said one end and a cylindrical portion extending from said first portion to the other end of said ring whereby pressure fluid on the same side of said backup plate as said ring produces force moments which deflect the ring into sealing engagement with said shaft when the pressure thereof reaches a predetermined value, the initial engagement between said ring and shaft being adjacent to said other end of said ring.

References Cited in the file of this patent

UNITED STATES PATENTS

| | | |
|---|---|---|
| 2,323,352 | Pitts | July 6, 1943 |
| 2,372,907 | Mercier | Apr. 3, 1945 |
| 2,513,533 | Thornhill | July 4, 1950 |
| 2,643,112 | Smith | June 23, 1953 |
| 2,758,857 | Smith | Aug. 14, 1956 |
| 2,772,900 | Campbell | Dec. 4, 1956 |
| 2,774,619 | Mercier | Dec. 18, 1956 |

FOREIGN PATENTS

| | | |
|---|---|---|
| 466,334 | Italy | Oct. 26, 1951 |
| 1,015,020 | France | June 25, 1952 |
| 148,184 | Sweden | Dec. 21, 1954 |